United States Patent
Barrell et al.

(10) Patent No.: US 12,504,898 B1
(45) Date of Patent: Dec. 23, 2025

(54) MODIFYING STORAGE SYSTEM CONFIGURATION TO ADJUST RELIABILITY WITH INCREASE IN CAPACITY OF STORAGE SYSTEM

(71) Applicant: VDURA, Inc., San Jose, CA (US)

(72) Inventors: Michael Barrell, Longmont, CO (US);
Erik David Salo, Longmont, CO (US);
Christopher James Girard, Sanford, FL (US)

(73) Assignee: VDURA, Inc., San Jose, CA (US)

( * ) Notice: Subject to any disclaimer, the term of this patent is extended or adjusted under 35 U.S.C. 154(b) by 9 days.

(21) Appl. No.: 18/899,811

(22) Filed: Sep. 27, 2024

(51) Int. Cl.
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
CPC .............................. G06F 3/0629; G06F 3/0604
See application file for complete search history.

(56) References Cited

U.S. PATENT DOCUMENTS

| | | | |
|---|---|---|---|
| 2016/0380650 A1* | 12/2016 | Calder | H03M 13/3746 714/766 |
| 2020/0067789 A1* | 2/2020 | Khuti | H04L 41/5009 |
| 2021/0117216 A1* | 4/2021 | Savir | G06F 9/5077 |
| 2022/0398156 A1* | 12/2022 | Miller | G06F 11/108 |
| 2024/0338141 A1* | 10/2024 | Bernat | G11C 11/4074 |

* cited by examiner

*Primary Examiner* — Nicholas A. Paperno
(74) *Attorney, Agent, or Firm* — Fenwick & West LLP

(57) ABSTRACT

A storage system distributes data across multiple nodes, where the data is stored with partial redundancy to meet a predetermined reliability level. The system monitors a number of nodes in the storage system to determine whether a number of nodes changes. Responsive to determining that the number of nodes changes, the system determines whether reliability level of the storage system exceeds the predetermined reliability level by a threshold. Responsive to determining that the reliability level of the storage system exceeds the predetermined reliability level by the threshold, the system adjusts a data storing scheme of the storage system to reduce redundancy and increase available storage capacity in the storage system, while maintaining the predetermined reliability level.

20 Claims, 9 Drawing Sheets

MODIFYING STORAGE SYSTEM CONFIGURATION TO ADJUST RELIABILITY WITH INCREASE IN CAPACITY OF STORAGE SYSTEM

BACKGROUND

1. Field of the Disclosure

The present disclosure relates to storage systems and more specifically to modifying storage system configuration to balance data reliability and storage capacity of storage systems.

2. Description of the Related Art

In storage systems, data reliability include important metrics, which are often managed through techniques like replication or erasure coding. Replication simply makes copies of the entire dataset and stores them on different nodes. While simple, it is less storage efficient than erasure coding because it requires 100% duplication (or more) of data.

Erasure coding offers higher storage efficiency because it uses less redundancy than full replication, while still providing high reliability. It allows for data reconstruction with fewer stored copies, resulting in more usable storage capacity compared to replication. Erasure coding breaks data into chunks, stores them across multiple nodes, and generates redundant chunks for protection. For example, a file might be split into several data chunks. In addition to the data chunks, parity chunks are created. These parity chunks are additional pieces of data that can be used to reconstruct the original file if one or more data chunks are lost or corrupted. The number of parity chunks is configurable and typically depends on the required level of redundancy and reliability. Both the data chunks and the parity chunks are stored across multiple storage nodes in a distributed system. This distribution ensures that if some nodes fail or data becomes inaccessible, the system can still recover the complete data using the remaining chunks and the parity chunks.

For example, an "8+2" erasure coding scheme might break a file into 8 data chunks and create 2 parity chunks. These 10 total chunks are then distributed across 10 nodes. If 1 or even 2 nodes fail the system can use the remaining chunks (including the parity) to fully reconstruct the original data. The "8+2" scheme corresponds to a number of node failures the system can tolerate (in this case, up to 2 failures). The reliability of such systems is often measured in terms of availability (accessibility of data) and durability (ability to avoid data loss over time), typically expressed as a number of "nines" (e.g., 99.999% durable or available).

SUMMARY

As more nodes are added to a system, a storage system's natural redundancy and reliability increase. Embodiments described herein allow for dynamic adjustments based on the number of nodes, reclaiming storage space as needed while keeping the reliability within the desired thresholds.

A method or a system balances data reliability and storage capacity. The system distributes data across multiple nodes. The data is stored with partial redundancy to meet a predetermined reliability level. The system monitors a number of nodes in the storage system to determine whether a number of nodes changes. Responsive to determining that the number of nodes changes, the system determines whether reliability level of the storage system exceeds the predetermined reliability level by a threshold. Responsive to determining that the reliability level exceeds the predetermined reliability level by the threshold, the system adjusts a data storing scheme to reduce redundancy and increase available storage capacity, while maintaining the predetermined reliability level.

For example, the data storing scheme may be an erasure coding scheme, involving dividing a file into multiple data chunks, calculating parity chunks from these data chunks, and then distributing both the data and the parity chunks across multiple storage nodes. The adjustment of the data storing scheme may include adjusting a ratio between a number of data chunks and a number of parity chunks. For example, the original data storing scheme may be an 8+2 erasure coding scheme. The system may change the erasure coding scheme from 8+2 a 8+1 or 9+2 to reduce the amount of storage used for redundancy (parity chunks), thereby increasing the usable data capacity.

Accordingly, the system dynamically adjusts the data storing scheme to increase usable data capacity while maintaining a desired reliability level, improving the functioning of computing system and data storage technologies.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The teachings of the embodiments can be readily understood by considering the following detailed description in conjunction with the accompanying drawings.

Figure 1:
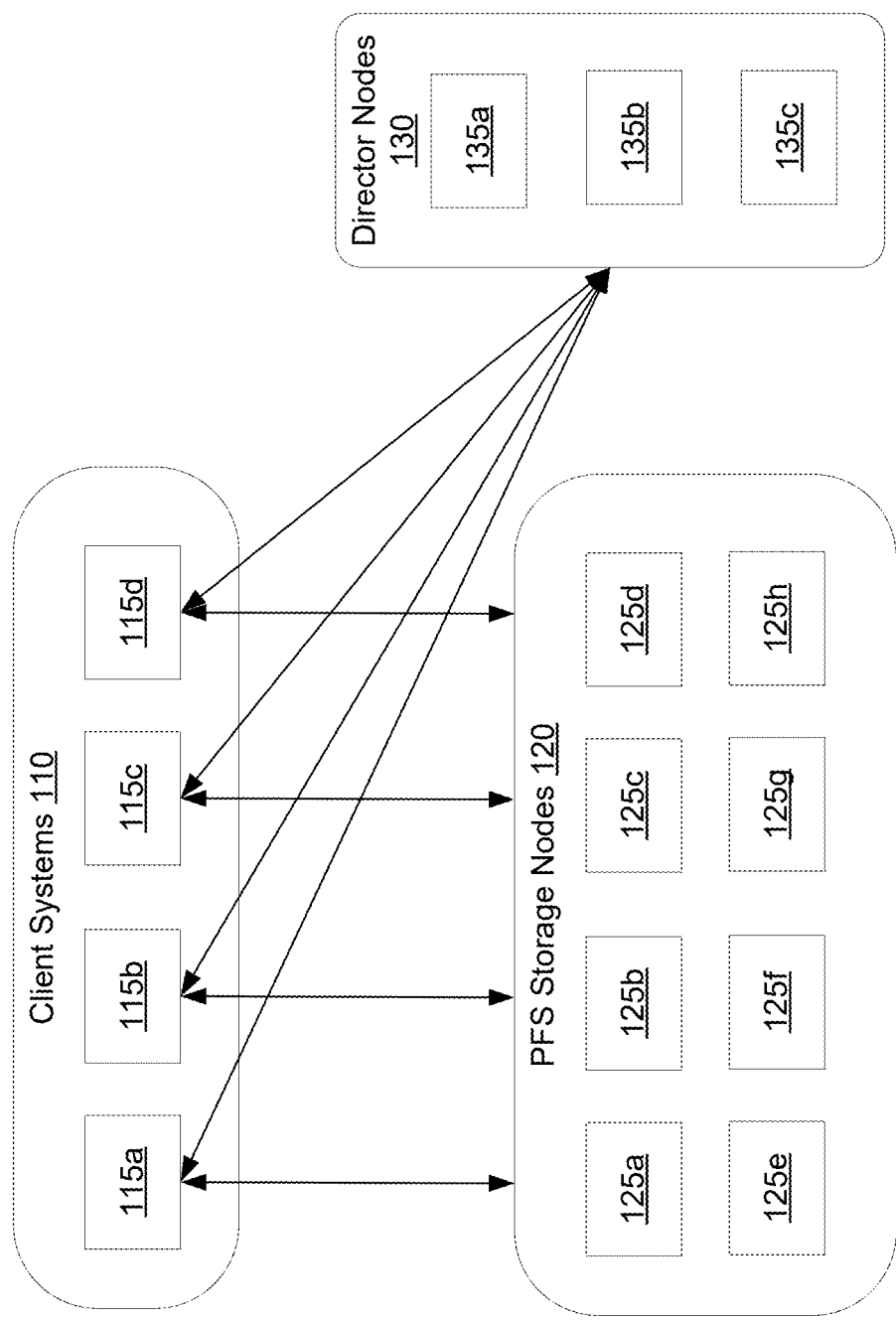
FIG. 1 illustrates the various components in the system environment of a storage system, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A storage system according to an embodiment uses multiple storage nodes and performs parallel and redundant access to data storage nodes to deliver high performance data access with scalability and reliability. For example, the storage system may implement erasure coding schemes to provide partial redundancy, ensuring desired reliability. In an erasure coding scheme, data is divided into multiple data chunks, and then additional parity chunks are generated from these data chunks. Parity chunks are extra pieces of information that are used to rebuild the lost data if a failure occurs (e.g., a node or disk failure). Unlike replication, which requires duplicating entire dataset, erasure coding creates a smaller amount of redundant data (parity chunks) relative to the original data, which makes it more storage-efficient. The storage system can recover lost or corrupted data chunks using remaining data chunks and parity chunks. For example, in an 8+2 erasure coding scheme, data is divided into 8 chunks, and 2 parity chunks are added. If up to 2 chunks are lost (e.g., due to a node failure), the storage system can still reconstruct the original data using the remaining chunks and parity chunks. In erasure coding schemes, both data chunks and parity chunks are distributed across multiple nodes in a network. this ensures that even if one or more nodes fail, the data can still be recovered from the other nodes. For example, in an 8+2 erasure coding scheme, a file is split into 8 data chunks and 2 parity chunks. These 10 total chunks are stored across 10 different nodes. If up to 2 nodes fail, the storage system can still reconstruct the original data using the remaining 8 data chunks and the 2 parity chunks.

When an amount of data being stored increases beyond the capacity of the existing nodes, more nodes are added to accommodate the growth. For example, this can occur when businesses accumulate more data over time (e.g., big data applications, IoT data, video storage, etc.). New applications or services may also require additional storage space. Further, in cloud environment or systems with auto-scaling, nodes can dynamically scale up or down based on the workload. If workload increases, the system may automatically increase the number of active nodes, and vice versa.

As the number of nodes increases, the reliability of the storage system also improves. However, existing storage systems do not account for this change when configuring data storage schemes. As a result, the system's reliability may continue to increase with minimal benefit to the underlying applications. For example, a user may initially configure the storage system with a specified reliability target. Over time, as additional nodes are added, the system's reliability naturally exceeds the user-specified threshold. However, the benefit of surpassing this user-configured reliability is marginal. For instance, if an application can tolerate a few hours of downtime per year, achieving just a few minutes of downtime is not cost-effective, as higher reliability results in unnecessary redundancy, i.e., an excessively large portion of storage being used for redundant chunks.

The embodiments described herein improves the storage system by enabling dynamic adjustment of data storing scheme when the system's reliability exceeds the configured level. For instance, as a number of nodes increases, the system reduces redundancy (e.g., by utilizing fewer parity chunks) to reclaim storage capacity. This allows the storage system to return additional storage capacity to the user while preserving the desired reliability.

Example Storage System

FIG. 1 illustrates the various components in the system environment of a storage system, according to an embodiment. The system environment of the storage system includes a set 110 of client systems 115*a*, 115*b*, 115*c*, 115*d*, a set 120 or storage nodes 125*a*, 125*b*, 125*c*, 125*d*, 125*e*, 125*f*, 125*g*, 125*h* and a set 130 of director nodes 135*a*, 135*b*, 135*c*. The director nodes 135 and storage nodes 125 are computer systems that run the storage system. A client system 115 includes a client driver that is a loadable software module that interacts with the director nodes and storage nodes to read and write the files stored by the storage system. Any required administration is performed via a graphical user interface (GUI) or call level interface (CLI) running on a director node 135. All the director nodes and storage nodes work together to provide a single file system namespace referred to as a realm.

According to an embodiment, the storage system separates the control plane from the data plane. The director nodes 135 in the storage system form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the storage system storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The storage system scales out both director nodes 135 and storage nodes 125. For any given configuration of the system, additional director nodes can be added for more metadata processing performance. Similarly additional storage nodes can be added for more capacity or more storage performance.

Figure 2:
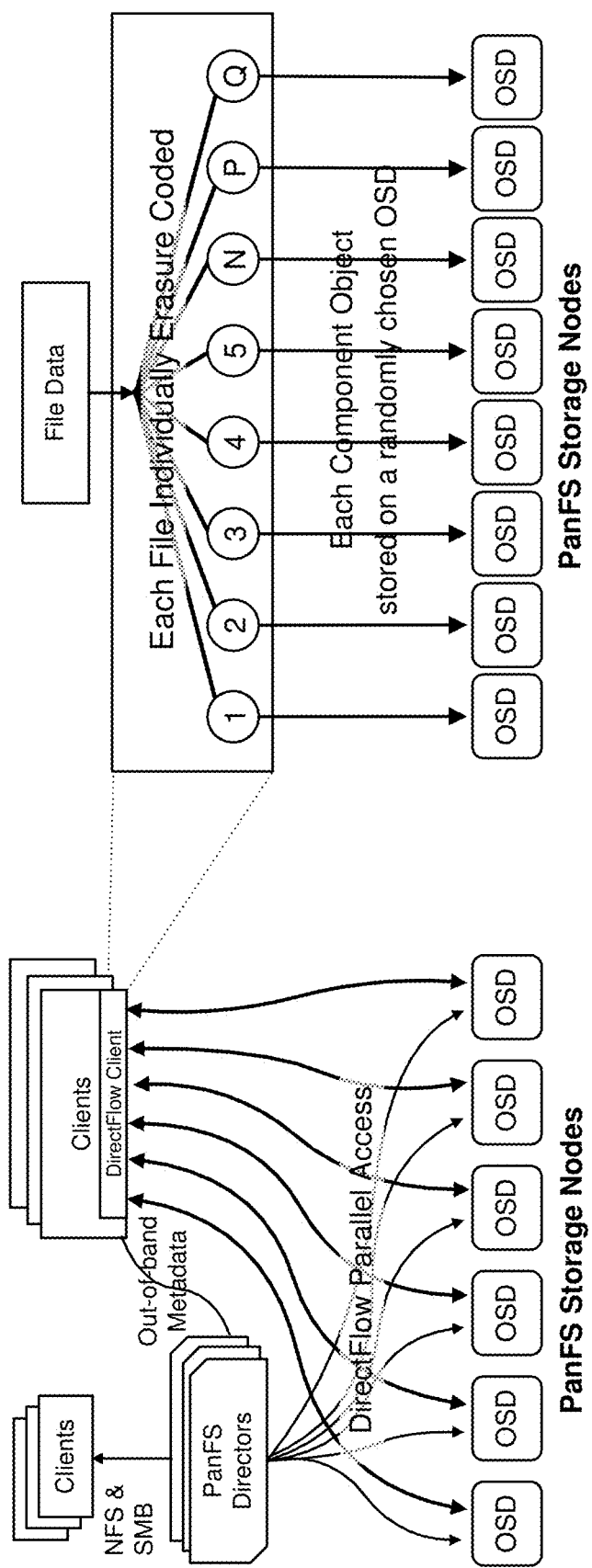
FIG. 2 illustrates how data is stored in a file in the storage system, in accordance with one or more embodiments.

FIG. 2 illustrates how data is stored in a file in the storage system, according to an embodiment. The storage system uses multiple storage nodes by assigning a map to each file. The map for a file shows where all the striped component parts of that file are located, and which storage node holds each part. The client driver uses the map to determine which storage nodes to access, directly or in parallel. storage system uses network erasure coding as part of that striping to ensure data integrity and reliability.

The client driver provides the semantics of a locally-mounted, POSIX-compliant file system. The storage system ensures that if a process P2 (possibly on another compute server) is writing to a file at the same time the process P1 is reading from the file, this process P1 will not read stale data. Accordingly, storage system provides cache coherency across all the nodes running the client driver.

Storage system performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the storage system provides a consistent system performance.

Figure 3:
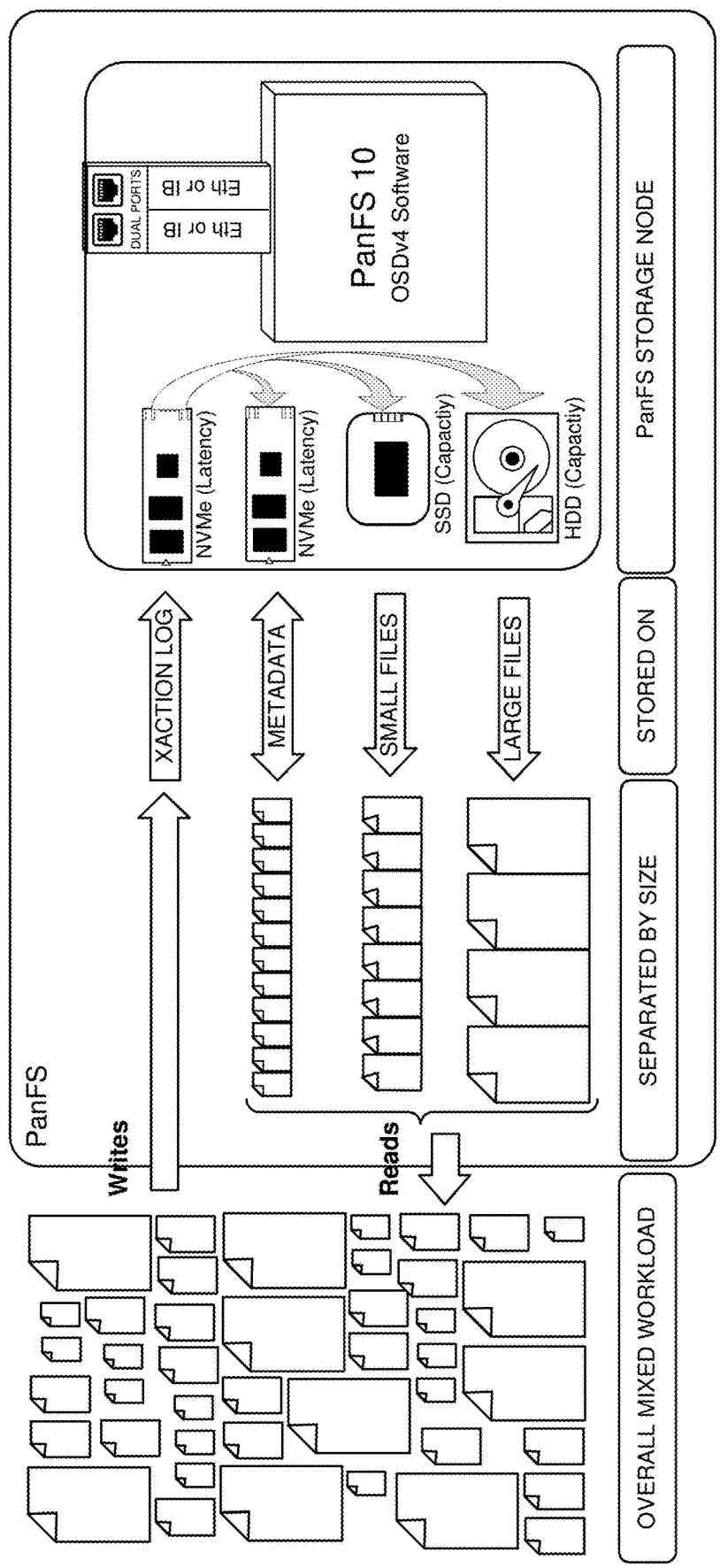
FIG. 3 illustrates the operation of storage nodes of the storage system, in accordance with one or more embodiments.

FIG. 3 illustrates the operation of storage nodes of the storage system, according to an embodiment. The storage system architecture provides performance and reliability advantages as well as significant performance optimizations using the storage node software to enable efficient use of the available storage media inside each storage node. The storage system storage node handles multiple performance tiers of storage. According to an embodiment, the different performance tiers of a storage node include storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The storage system takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The storage system tries to keep each SSD full above a threshold level, for example, above 80% full. If an SSD falls below that threshold level, the storage system selects the smallest component objects from the next slowest set of drives and moves them to the SSD until it is about 80% full. If the SSD is too full, storage system moves the largest component objects on the SSD to the next slower tier of drives. Every storage node performs this optimization independently and continuously. A storage node selects component objects to move by looking in its local metadata database.

Storage nodes in the storage system are object storage devices (OSDs). An object stored in an OSD is a Small Computer System Interface (SCSI) object. The storage system can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the storage system supports multiple blade sets in a realm and in the same namespace at the same time.

Figure 4:
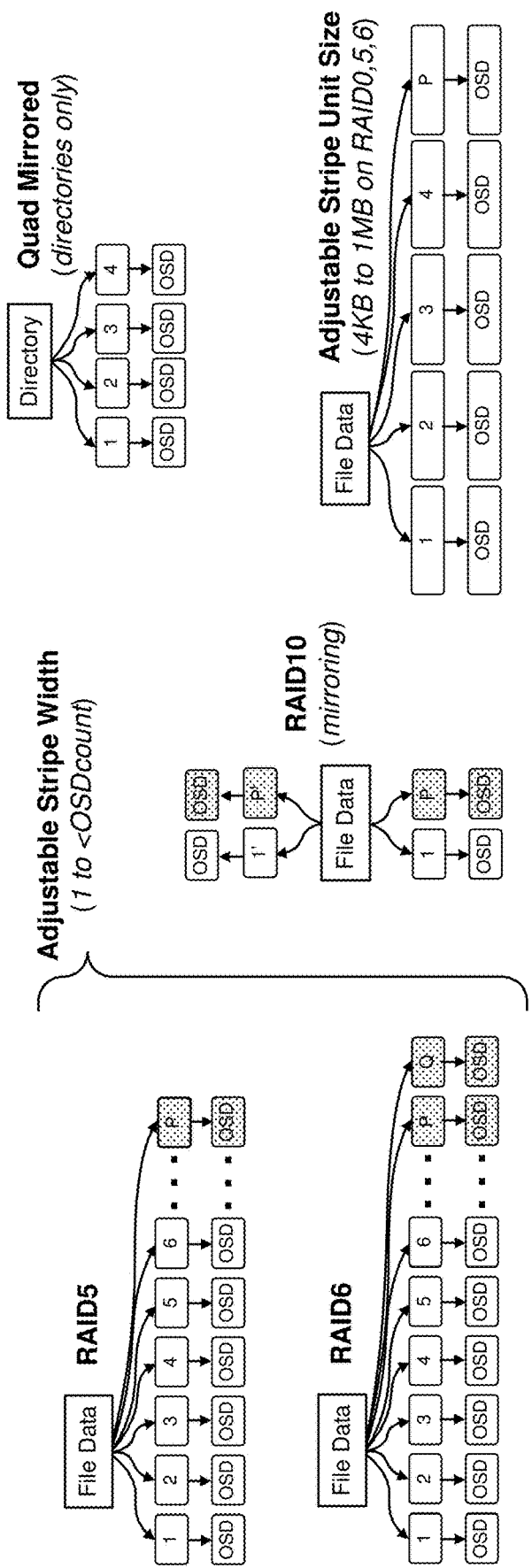
FIG. 4 shows the details of layout of a file stored in the storage system, in accordance with one or more embodiments.

FIG. 4 shows the details of layout of a file stored in the storage system, according to an embodiment. The storage system stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The storage system stores large POSIX files using erasure coding across multiple component objects, and store small POSIX files using triple-replication across three component objects. This approach delivers higher performance and makes it more space efficient. Unless the first write to a file is a large one, the storage system starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a storage system storage node fails, the storage system reconstructs only those component objects that were on the failed storage node. This is distinct from a RAID array that would reconstruct the entire raw capacity of the storage node. The storage system reads the component objects for each affected file from all the other storage nodes and uses each file's erasure code to reconstruct the component objects that were on the failed node.

When a BladeSet in the storage system is first set up, the storage system sets aside a configurable amount of spare space on all the storage nodes in that BladeSet to hold the output from file reconstructions. When the storage system reconstructs a missing component object, it writes it to the spare space on a randomly chosen storage node in the same BladeSet. As a result, during a reconstruction the storage system uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the storage system protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the storage system maintains a complete directory tree, it can identify the full pathnames of precisely which files need to be restored from a backup or reacquired from their original source, and can therefore also recognize which files were either unaffected or recovered using their erasure coding.

Storage Reliability

A user may be allowed to configure reliability at an initial setup or configuration phase of the storage system. This occurs before the system begins processing data, as it allows the user to specify the desired reliability target based on the specific needs of their applications.

Generally, reliability includes durability and availability. Durability refers to the storage system's ability to avoid data loss over time. Availability refers to the ability of the system to remain online and accessible. Durability and availability are often expressed as percentage or 'nines," where more nines represent better reliability.

Table 1 below shows statistics for storage systems based on the number of "nines" in their durability rating. The more nines, the less likely data loss is. For a system with 90% durability (1 nine), 1 out of every 10 systems is expected to experience data loss. For a system with 99% durability (2 nines), 1 out of every 100 systems is expected to have data loss. For 99.999% durability (5 nines), only 1 out of every 100,000 systems may experience data loss.

TABLE 1

| Nines | Percentage | How to think about it |
|---|---|---|
| 1 | 90% | For 10 systems 1 has data loss |
| 2 | 99% | For 100 systems 1 has data loss |
| 3 | 99.9% | For 1000 systems 1 has data loss |
| 4 | 99.99% | For 10000 systems 1 has data loss |
| 5 | 99.999% | For 100000 systems 1 has data loss |

Table 2 below shows statistics for storage systems based on the number of "nines" in their availability rating. For example, "1 nine" represents 90% uptime, "2 nines" represent 99% uptime, and so on. Each additional nine represents a higher degree of system availability. The total number of minutes the system is online (available) in a year may be calculated based on the availability percentage. There are 525,600 minutes in a year (60 minutes×24 hours×365 days). A system with 90% availability is online for 473,040 minutes per year, and such a system will be down for 52,560 minutes (36.5 days) per year. A system with 99.999% availability is online for 525,594 minutes per year, and such a system will be down for only 5 minutes per year.

TABLE 2

| Nines | Percentage | Minutes online per year | Minutes Down per year |
|---|---|---|---|
| 1 | 90% | 473040 | 52560 (36.5 days) |
| 2 | 99% | 520344 | 5256 |
| 3 | 99.9% | 525074 | 525 |
| 4 | 99.99% | 525547 | 52 |
| 5 | 99.999% | 525594 | 5 |

As the number of nines (availability percentage) increases, the system's downtime decreases significantly. For example, moving from 3 nines (99.9%) to 5 nines (99.999%) reduces downtime from 525 minutes (about 9 hours per year) to just 5 minutes per year. As shown in Table 1, a small increase in the number of nines results in a significant reduction in system downtime, especially at higher levels of availability.

Different types of applications often have their targeted availabilities and durabilities. For example, systems like in-house testing environments or development servers might tolerate significant downtime (e.g., 90% availability), as their availability is less critical to the business. If these systems are down, it does not impact external users or production systems. Such systems may also tolerate occasional data loss since the data is often temporary or easy to recreate. Losing 1 out of 10 system in these environments may not have a significant business impact.

As another example, social media platforms may require a higher availability (e.g., 99.9% or 99.99% availability) due to the business nature of transactions and the need for 24/7 service. Such systems may also tolerate some level of data loss, as losing occasional user posts or non-critical content would not drastically impact overall platform functionality.

On the other hand, stock exchanges or real-time trading systems may require extremely high availability (e.g., 99.999% or even higher availability) to ensure transactions can be executed without delays, as downtime could lead to massive financial losses. Such systems may also require high durability to ensure that no transaction data is lost, as this could lead to significant financial losses.

In a storage system that stores data with partial redundancy, reliability may be determined based in part on data storing schemes, and a number of nodes in the storage system. Additional details on how durability and availability are determined are discussed further below with respect to FIGS. 5-7.

Determining Durability

Figure 5:
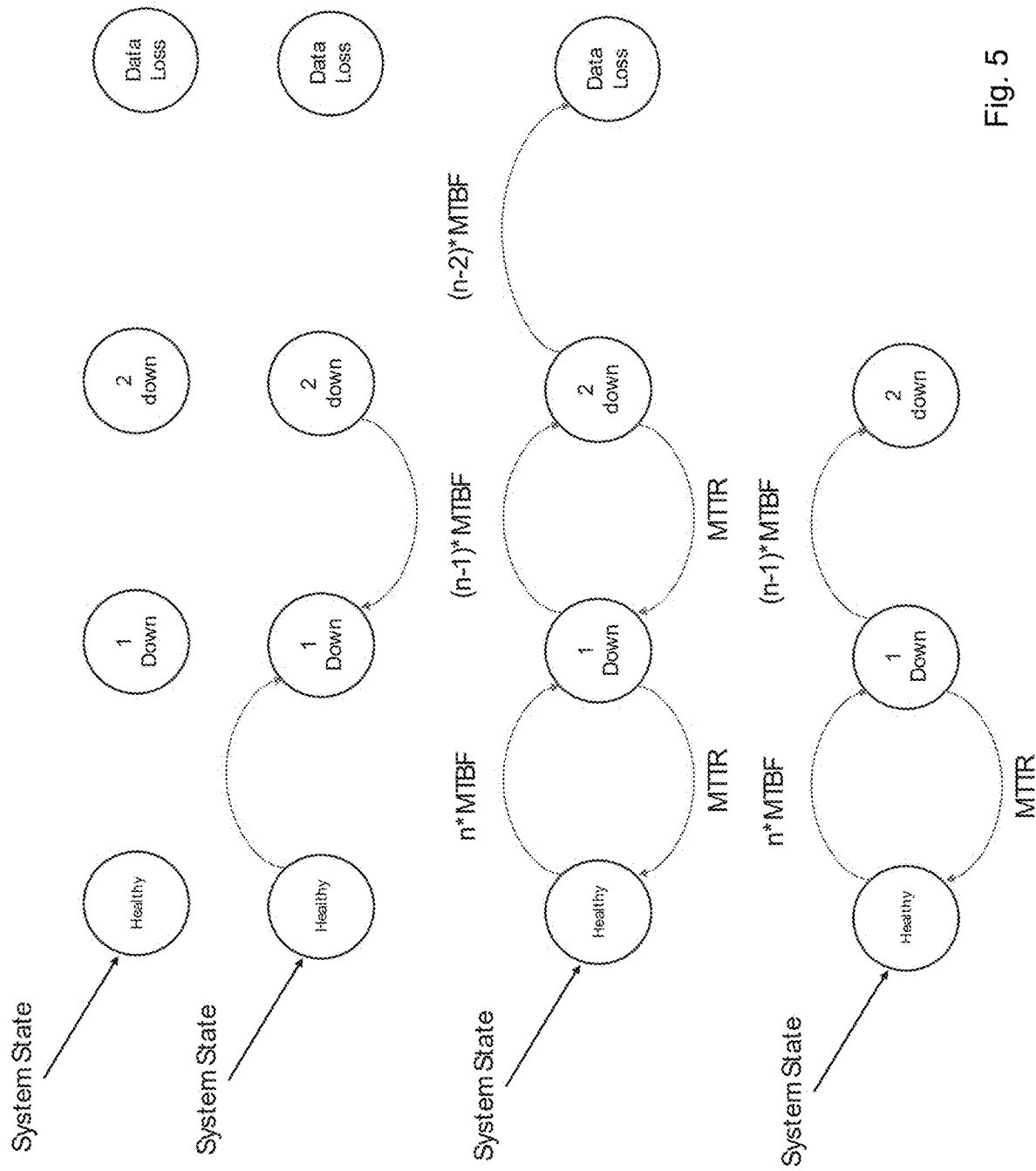
FIG. 5 illustrates states of a storage system and how they can be transitioned between each other, in accordance with one or more embodiments.

FIG. 5 illustrates states of a storage system and how they can be transitioned between each other, in accordance with one or more embodiments. The storage system transitions between different states, namely healthy, 1 down, 2 down, and data loss, over time. Healthy indicates that the storage system is fully functional, with no failures. 1 down indicates one node of the system has failed. 2 down indicates two nodes have failed. Data loss indicates the system can no longer recover data, and data loss occurs. Mean time between failure (MTBF) represents an average time between failures in the storage system. N*MTBF refers to an average time it takes for the first failure in the system, where n is a number of total nodes, (n−1)*MTBF represents the time it takes for the second failure to occur after the first failure, given that (n−1) nodes are left functioning. (n−2)*MTBF represents the time it takes for the third failure to occur after two failures have already happened. Mean time to repair (MTTR) represents the time it takes to repair a failed component or node in the system and restore the system to a healthy state.

As illustrated in FIG. 5, the storage system starts in a healthy state, meaning no nodes or components have failed. The storage system can stay in this state for n*MTBF, which is the mean time before a failure occurs across the entire system. After the first failure, the system transitions to the 1 down state. The system is still operational but one node has failed. If the failure is repaired within the MTTR, the system can go back to the heathy state. If another node fails before the first failure is repaired, the system moves into the 2 down state. The time to this transition is represented by (n–1)*MTBF. After a second failure, the system is now in the 2 down state. If the system can tolerate two failures (such as in erasure coding with 2 redundancy), it can still operate. The system can transition back to the 1 down state if one of the failed nodes is repaired within the MTTR. If a third failure occurs while the system is in the 2 down state, data is lost, and the system transitions to the data loss state. The time to this final failure is represented by (n–2)*MTBF. If a third failure occurs while the system is in the 2 down state, data is lost, and the system transitions to the data loss state. Once in this state, data is irrecoverable unless external backups or other recovery methods are in place.

Durability depends on the probabilities of transitioning between states. The factor in durability is how quickly the system can recover from failures (via MTTR) compared to how quickly subsequent failures occur (via MTBF). The longer the MTBF and the shorter the MTTR, the higher the durability of the system. If the system can repair components faster than failures occur, it is more likely to stay in the healthy or 1 down state, maintaining data durability. If multiple failures occur before the system can repair the previous failures, the likelihood of reaching the data loss state increases.

A redundant array of independent disks (RAID) is a data storage technology that combines multiple physical disk drives into a single logical unit to achieve improvements in data reliability. RAID systems use various techniques like data redundancy (through mirroring or parity) and striping (spreading data across multiple disks) to ensure data is protected from hardware failures and can be accessed quickly. Stripping is a technique where data is divided into smaller chunks and spread across multiple disks. This can improve performance because read/write operations are distributed over multiple disks, allowing for parallel access. Mirroring is a technique where data is duplicated and stored on more than one disk. This ensures that if one disk fails, the data is still available from the other disks. Parity is data used to recover lost data in case of a disk failure. Parity data is spread across multiple disks and helps reconstruct data from the remaining disks if one fails.

RAID levels refer to the different ways RIAD can be configured to provide various balances of fault tolerance, data redundancy, performance, and storage efficiency. Different RAID levels suit different needs, such as maximizing speed, ensuring data safety, or offering a balance between the two. In RAID 0, data is divided and written across multiple disks to improve read and write speeds, but no redundancy is provided. In RAID 1, the same data is written to two disks. If one disk fails, the other disk continues to function. RAID 5 and RAID 6 are erasure coding schemes, which use parity chunks to recover from disk failures. Parity is distributed across disks, allowing recovery of data if a disk fails (one disk in RAID 5, two disks in RAID 6). RAID 10 uses both RAID 1 mirroring (for redundancy) and RAID 0 striping (for performance). RAID 60 uses both RAID 0 (for striping) and RAID 6 (for redundancy).

MTTDL of a RAID system can be represented by:

$$MTTD_{RAID} = \frac{(n-C-1)! * MTBF^{C+1}}{n! * MTTR^C} \qquad \text{Equation (1)}$$

where C is parity chunks, n is a number of data chunks, MTBF is an average time between successive failures in the system measured in hours, MTTR is an average time it takes to repair a failed node or disk in the RAID system.

As discussed above MTTDL represents an average time until the RAID system loses data due to multiple failures that exceed the redundancy built into the system. Equation (1) determines a likelihood of data loss by considering the number of parity chunks C, the number of data chunks n, and the time between failures (MTBF) and repairs (MTTR). The factorials (e.g., n!) reflect the combinatorial possibilities of failures occurring in the RAID system, a higher MTTDL indicates a more reliable system that is less likely to lose data over time.

MTTDL of a RAID 6 system can be represented by:

$$MTTDL_{R6} = \frac{MTBF^3}{n*(n-1)*(n-2)*MTTR^2} \qquad \text{Equation (2)}$$

where n is a number of data chunks, a number of parity chunks C is 2.

Because the number of parity chunks is 2, in Equation (2), MTTR is raised to the power of 2, indicting a combined time it takes to repair two failed components, and MTBF is raised to the power of 3=(2+1), indicating that RAID 6 can withstand up to two failures and still survive, but data is lost upon a third failure. the expression n*(n–1)*(n–2) reflects the decreasing number of available nodes as failure occur.

Distributed RAID is a RAID architecture that extends traditional RAID functionality by distributing both data and parity across multiple nodes in a distributed system rather than within a single RAID array, offering enhanced fault tolerance, scalability, and performance. For example, distributed RAID 6 combines the principles of RAID 6 with the distributed architecture. Similar to traditional RAID 6, distributed RAID 6 uses striping with double parity. Data is broken into chunks and written across multiple nodes, and two sets of parity data are calculated and stored. The parity data allows the system to recover from the failure of up to two nodes or disks. Distributed RAID 6 can handle two simultaneous failures (whether at the disk or node level). In the event of a failure, the system can reconstruct the lost data using the remaining data and the two sets of parity information.

MTTDL of a distributed RAID 6 system can be represented by:

$$MTTDL_{dR} = MTTDL_{R6} * \left(\frac{D}{n}\right)^{\frac{C*(C-1)}{2}} \qquad \text{Equation (3)}$$

where D is a total number of nodes in the distributed RAID 6 system, C is parity chunks, n is a number of data chunks.

Durability of the distributed RAID 6 system can be represented by:

$$\text{Durability} = e^{\frac{-t}{MTTDL_{dR}}} \qquad \text{Equation (4)}$$

where t is years in hours.

9 s of durability can be represented by:

$$9 \text{ s of durability} = -\log_{10}(1-\text{Durability}) \quad \text{Equation (5)}$$

9 s of durability is a measure used to express the durability of a system in terms of 'nines." For example, five nines of durability means that the system is 99.999% durable. Equation (5) translates the durability probability into the number of "nines." A higher number of nines means the system has a very low probability of data loss.

For example, annualized failure rate (ARF) is 18%, where ARF represents the percentage chance that a disk will fail over the course of a year. A higher AFR indicates a higher likelihood of failure. MTBF can be calculated as a total operating time (in hours) in a year divided by the failure rate, i.e., MTBF=8760/18%=48666 hours, representing an average time between failures of a disk. Assuming object storage device (OSD) capacity is 162 terabyte (TB), data transfer rate during rebuild operations after a failure is 720 MB/s, n=10 (8+2) indicating that the RAID 6 configuration uses 8 data blocks and 2 parity blocks, and D=12 nodes indicating a total number of nodes in the distributed RAID system. Based on these parameters, MTTR=162*1024*1024/720/360=65.5 hours.

Applying the above example specification values to Equations (3)-(5), $$MTTDL_{R6} = \frac{48666^3}{10*(10-1)*(10-2)*65.5^2}$$

$$MTTDL_{R6} = 37313145$$

$$MTTDL_{dR} = MTTDL_{R6} * \left(\frac{12}{10}\right)^{\frac{2*(2-1)}{2}}$$

$$MTTDL_{dR} = 44775774$$

$$\text{Durability} = e^{\frac{-8760}{MTTDL_{dR}}} = 0.999804$$

$$9s \text{ of durability} = -\log_{10}(1-0.999804) = 3.7$$

As such, 9 s durability of the storage system is 3.7 nines.

Figure 6:
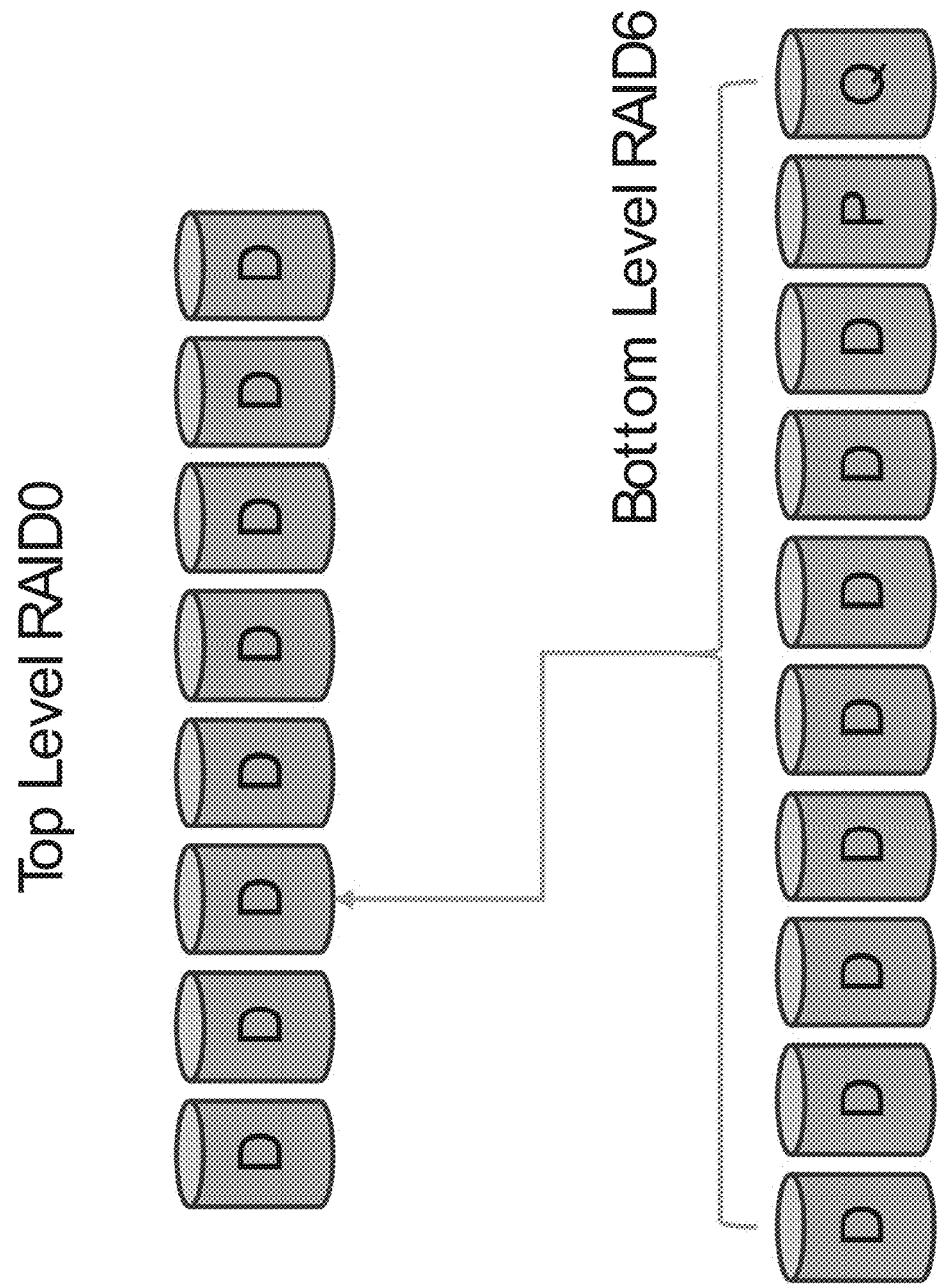
FIG. 6 illustrates an example 2-level configuration RAID 60, which combines RAID 0 and RAID 6, in accordance with one or more embodiments.

In some embodiments, a storage system is in a hierarchical configuration combining different RAID levels. FIG. 6 illustrates an example 2-level configuration RAID 60, which combines RAID 0 and RAID 6, in accordance with one or more embodiments. The system is configured with RAID 6 subsystem at a bottom level and RAID 0 subsystem at a top level, providing high fault tolerance from RAID 6 subsystem and performance from RAID 0 subsystem. Bottom level RAID 6 subsystem applies an 8+2 erasure configuration, meaning 8 data chunks (D) and 2 parity chunks (P and Q). RAID 6 subsystem can tolerate the failure of two disks. Top level RAID 0 subsystem stripes data across 8 data disks, corresponding to the 8 data disks of the RAID 6 subsystem. RAID 0 subsystem does not provide redundancy, meaning if a RAID 0 subsystem's disk fails, the system cannot recover the data. However, RAID 6 subsystem provides high durability.

Similar to the RAID 6 system described above, durability of the RAID 6 subsystem can be represented by:

$$MTTDL_{R6} = \frac{MTBF^3}{n*(n-1)*(n-2)*MTTR^2} \quad \text{Equation (2)}$$

$$\text{Durability} = e^{\frac{-t}{MTTDL_{dR}}} \quad \text{Equation (4)}$$

where MTBF is mean time between failures, n is a number of disks in the RAID 6 subsystem.

Durability for the RAID 0 subsystem can be represented by:

$$MTTDL_{R0} = n*\lambda \quad \text{Equation (6)}$$

$$MTBF = \frac{8760}{\lambda} \quad \text{Equation (7)}$$

where MTBF is mean time between failures, A is a rate of failure for each RAID 6 array, n is a number of data chunks in the RAID 6 subsystem corresponding to the number of data disks in the RAID 6 subsystem and the number of data disks in the RAID 0 subsystem, 8760 is a number of hours in a year.

Referring back to Equation (1), the factors that influence durability include the number of parity chunks (C) and the number of data chunks (n). By increasing the number of parity chunks (C), the amount of redundancy in the system increases, making it more resilient to failures, and vice versa. Additionally, reducing the number of data chunks (n) while keeping parity the same means there are fewer data blocks to protect, which also increases the system's ability to tolerate failures before data is lost, and vice versa. For example, erasure scheme 4+2 (with 4 data blocks and 2 parity blocks) is more durable than erasure scheme 8+2 (with 8 data blocks and 2 parity blocks). As another example, erasure scheme 8+2 is more durable than erasure scheme 8+1 (with 8 data blocks and 1 parity block).

Figure 7:
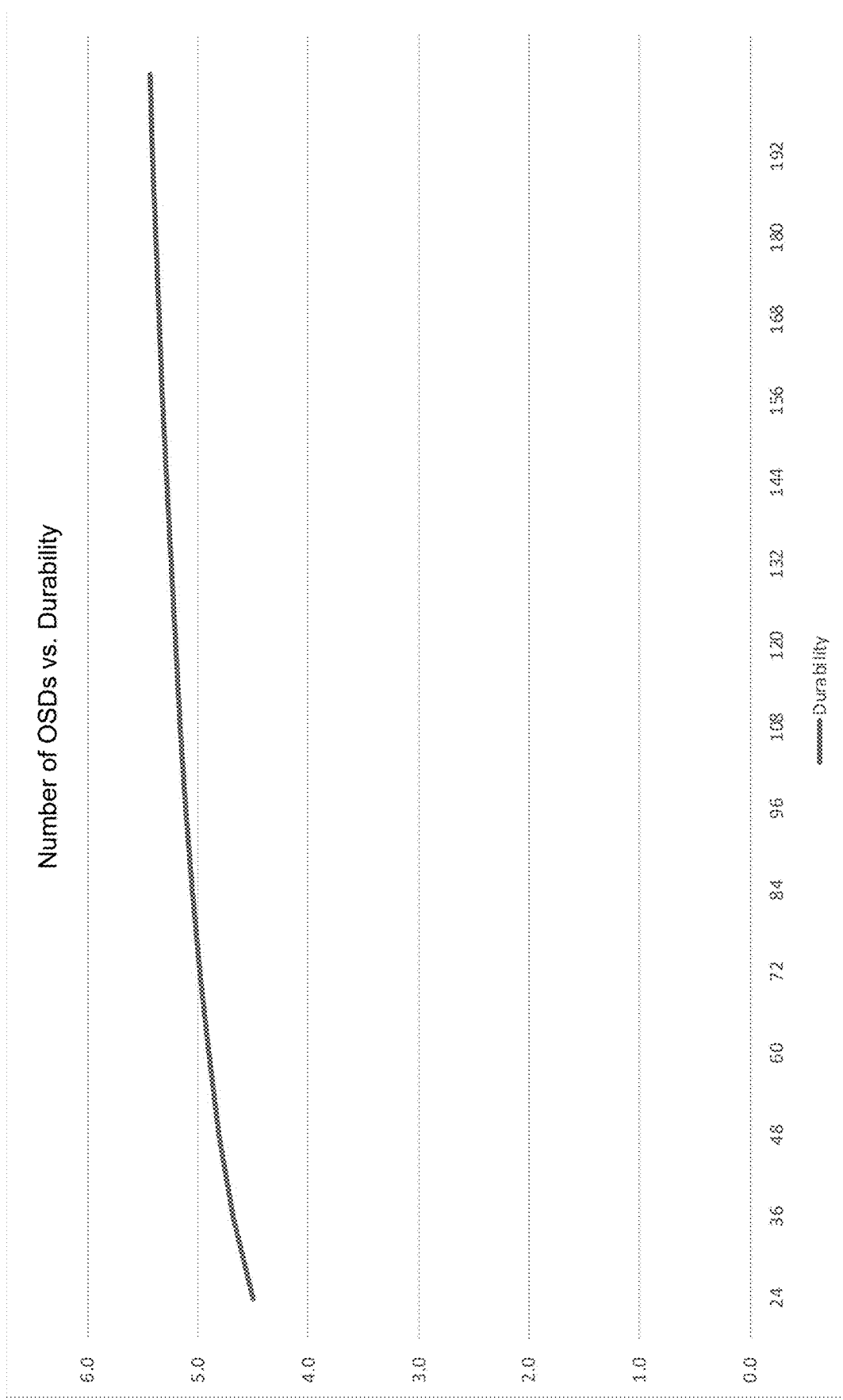
FIG. 7 illustrates an example relationship between a number of OSDs and durability (expressed in "nines") for a storage system in accordance with one or more embodiments.

On the other hand, referring to Equation (3), durability is also associated with a number of OSDs (D). A greater number of OSDs also results in a greater durability. FIG. 7 shows an example relationship between a number of OSDs and durability (expressed in "nines") for a storage system in accordance with one or more embodiments. The X-axis represents the number of OSDs in the system, the Y-axis represents the nines of durability. The line shows the durability trend as the number of OSDs increases. The durability starts at around 4.5 nines and gradually increases as more OSDs are added, eventually approaches 5.5 nines as the number of OSDs increases beyond 190.

Determining Availability

As discussed above, reliability also includes availability. The availability of a storage system may also be determined based on the data storing scheme and a number of nodes. Referring back to FIG. 5, the storage system transitions between different states, namely, healthy, 1 down, 2 down, and not available. MTBF is an average time that a system operates before a failure occurs. The term n*MTBF represents the time until the first failure, and similarly, (n−1)*MTBF and (n−2)*MTBF represent the times until subsequent failures. MTTR is an average time required to repair or restore the system after a failure.

As illustrated, the system is initially in the heathy state. The system remains in this state until a failure occurs, with the time before failure being n*MTBF. After a first failure, the system transitions to the 1 down state, where one component has failed. If repairs are made within the MTTR, the system can return to the healthy state. If the repair is not made before another failure occurs (i.e., before (n−1)*MTBF), the system transitions to the 2 down state. In this state, two components have failed. The system can still return to a healthier state if repairs are made within the MTTR, allowing to go back to the 1 down state or eventually the healthy state. If a third failure occurs (i.e., before (n−2)*MTBF) and repairs have not been completed, the system transitions to the not available state. This is the failure state where the system is no longer operational, as too many failures have occurred without successful repair. Once the system reaches this state, availability is lost, and the system cannot function until repairs are made.

Availability is determined by how often the system can recover from failures and remain operational. It depends in part on MTBF and MTTR. A system has high availability if failures are infrequent (high MTBF), meaning it spends a long time in the healthy state, and/or repairs are quick (low MTTR), meaning the system can return to the healthy state quickly after a failure. As such, the system has multiple chances to recover as long as repairs are made within the MTTR. If the system successfully repairs failures after transitioning to 1 down or 2 down, it avoids the not available state and maintains availability. Notably, there are differences between durability and availability. Durability focuses on data preservation. Availability focuses on system uptime.

Data availability mean time to not available (MTTNA) of a storage system can be represented by:

$$MTTNA_{RAID} = \frac{(n-C-1)! * MTBF^{C+1}}{n! * MTTR^{C+1}},$$ Equation (8)

where C is a number of parity chunks, n is a number of servers, switches, etc.

MTTNA of a RAID 6 system can be represented by:

$$MTTNA_{R6} = \frac{MTBF^3}{n*(n-1)*(n-2)*MTTR^3},$$ Equation (9)

where n is a number of servers, switches, etc.

MTTNA of a distributed RAID 6 system can be represented by:

$$MTTNA_{dR} = MTTNA_{R6} * \left(\frac{D}{n}\right)^{\frac{C*(C-1)}{2}},$$ Equation (10)

where D is a total number of nodes in the distributed RAID 6 system, n is a number of servers, switches, etc.

Availability of the distributed RAID 6 system can be represented by:

$$\text{Availability} = e^{\frac{-t}{MTTNA_{dR}}},$$ Equation (11)

where t is years in hours.

9 s of availability can be represented by:

$$9 \text{ s of availability} = -\log_{10}(1-\text{Availability})$$ Equation (12)

9 s of availability is a measure used to express the availability of a system in terms of "nines." For example, five nines of availability means that the system is 99.999% available. Equation (10) translates the availability probability into the number of "nines." A higher number of nines means the system has a very low probability of not available.

For example, annualized failure rate (ARF) is 5%, where ARF represents the percentage chance that a disk will fail over the course of a year. A higher AFR indicates a higher likelihood of failure. MTBF can be calculated as a total operating time (in hours) in a year (24×365) divided by the failure rate, i.e., MTBF=8760/5%=175200 hours, representing an average time between failures of a disk. Assuming MTTR is 24 hours, n=10 (8+2) indicating that the RAID 6 configuration uses 8 data blocks and 2 parity blocks, and D=12 nodes indicating a total number of nodes in the distributed RAID system.

Applying the above example specification values to Equations (10)-(12), $$MTTNA_{R6} = \frac{175200^3}{10*(10-1)*(10-2)*24^3}$$

$$MTTNA_{R6} = 5.403e8$$

$$MTTNA_{dR} = MTTNA_{R6} * \left(\frac{12}{10}\right)^{\frac{2*(2-1)}{2}}$$

$$MTTNA_{dR} = 6.4386e8$$

$$\text{Availability} = e^{\frac{-8760}{MTTNA_{dR}}} = 0.999986$$

$$9s \text{ of availability} = -\log_{10}(1-0.999986) = 4.8$$

As such, 9 s of availability of the storage system is 4.8 nines.

As another example, annualized failure rate (ARF) is 1%, where ARF represents the percentage chance that a disk will fail over the course of a year. A lower AFR indicates a lower likelihood of failure. MTBF can be calculated as a total operating time (in hours) in a year (24×365) divided by the failure rate, i.e., MTBF=8760/1%=876000 hours, representing an average time between failures of a disk. Assuming MTTR is 72 hours, n=10 (8+2) indicating that the RAID 6 configuration uses 8 data blocks and 2 parity blocks, and D=10 nodes indicating a total number of nodes in the distributed RAID system.

Applying the above example specification values to Equations (10)-(12), $$MTTNA_{HA} = \frac{876000^2}{10*(10-1)*72^2}$$

$$MTTNA_{HA} = 1.64e6$$

$$\text{Availability} = e^{\frac{-8760}{MTTNA_{dR}}} = 0.994$$

$$9s \text{ of availability} = -\log_{10}(1-0.994) = 2.3$$

As such, 9 s of availability of the data system is 2.3 nines.

Referring back to Equation (8), the factors that influence durability include the number of parity chunks (C) and the number of servers, switches (n). On the other hand, referring to Equation (8), availability is also associated with a number of OSDs (D). A greater number of OSDs also results in a greater availability.

Automatic Balancing of Reliability and Capacity

Based on the above equations (1)-(12) and examples, reliability (including durability and availability) is related to the number of OSDs. As the system scales, the number of OSDs goes up, naturally increasing the reliability. However, such increased reliability has diminished benefits, because the desired reliability is associated with the type of applications being implemented. On the other hand, if the system lower the redundancy, while maintaining the reliability within the desired threshold, extra storage may be made available.

Existing storage system does not consider the dynamic change of the number of OSDs in configuring the storage scheme. The embodiments described herein improve the existing storage system by dynamically configuring the storage system based on the number of OSDs. When a number of OSDs is increased, the system determines whether an updated configuration should be implemented to reduce redundancy while still keeping the reliability within the desired threshold.

In some embodiments, the storage system is initially configured based on key metrics, such as availability, durability, and/or capacity efficiency. For example, a user may configure a storage system to have 4 nines availability, meaning the system is expected to be 99.99% available. The user may also configure the storage system to have 5 nines durability, meaning the system has 99.999% durability. As time goes on, more and more OSDs are added, resulting in a durability and/or availability much higher than the originally configured threshold, resulting in unnecessary redundancy. The system monitors the number of OSDs, and automatically determines whether coding scheme should be adjusted based on the number of OSDs. The adjustment would reduce the redundancy of the system, while maintaining the reliability at or above the configured level.

In some embodiments, responsive to determining that the scheme of erasure coding should be adjusted, the system generates a recommendation, recommending the adjustment of the erasure coding scheme, prompting a user to approve the recommended adjustment. In some embodiments, responsive to determining that the scheme of erasure coding should be adjusted, the system automatically performs the adjustment.

Figure 8:
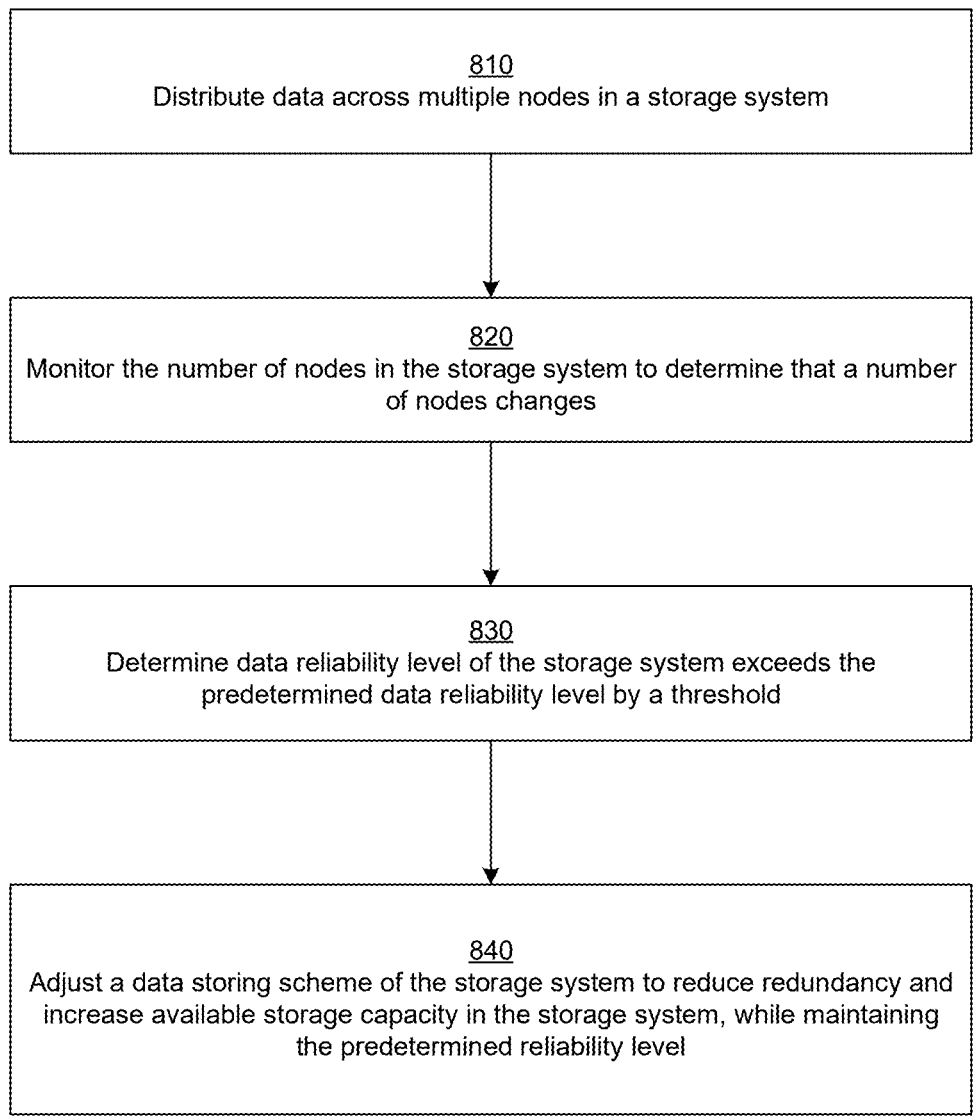
FIG. 8 is a flowchart of an example method 900 for balancing reliability and available storage capacity of a storage system, in accordance with one or more embodiments.

FIG. 8 is a flowchart of an example method 800 for balancing reliability and available storage capacity of a storage system, in accordance with one or more embodiments. The steps in the method 800 may be performed in any sequence. In some embodiments, more or fewer steps may be included in the method 800. The method 800 may be performed by a computing system, e.g., a storage system described herein with respect to FIGS. 1-8.

The storage system distributes 810 data across a plurality of nodes. The data is stored with partial redundancy to meet a predetermined reliability level. In some embodiments, the partial redundancy may be achieved by an erasure coding scheme. In an erasure coding scheme, data is divided into multiple data chunks, and then additional parity chunks are generated from these data chunks. Parity chunks are extra pieces of information that are used to rebuild the lost data if a failure occurs (e.g., a node or disk failure). Unlike replication, which requires duplicating entire dataset, erasure coding creates a smaller amount of redundant data (parity chunks) relative to the original data, which makes it more storage-efficient. The storage system can recover lost or corrupted data chunks using remaining data chunks and parity chunks. For example, in an 8+2 erasure coding scheme, data is divided into 8 chunks, and 2 parity chunks are added. If up to 2 chunks are lost (e.g., due to a node failure), the storage system can still reconstruct the original data using the remaining chunks and parity chunks. In erasure coding schemes, both data chunks and parity chunks are distributed across multiple nodes in a network. this ensures that even if one or more nodes fail, the data can still be recovered from the other nodes. For example, in an 8+2 erasure coding scheme, a file is split into 8 data chunks and 2 parity chunks. These 10 total chunks are stored across 10 different nodes. If up to 2 nodes fail, the storage system can still reconstruct the original data using the remaining 8 data chunks and the 2 parity chunks.

In some embodiments, the predetermined reliability level may be configured by a user based on a type of application that is to be stored in the storage system. In some embodiments, the reliability level may include a durability level and/or an availability level. Durability refers to the ability of a storage system to preserve data over time and avoid data loss. Availability refers to the ability of the system to remain operational and accessible to users, meaning how often the data is available for access when requested. Durability and availability levels may be measured in terms of nines (e.g., 99.999% durability or availability, also referred to as 5 nines). The greater the number of nines the higher level of durability and/or availability.

The storage system monitors 820 the number of nodes to determine whether the number of nodes changes. As a volume of data grows, the storage system needs to scale to accommodate larger datasets, the system often adds more nodes to gain additional storage capacity, and vice versa. Responsive to determining that the number of nodes changes, the system determines 830 whether reliability level of the storage system exceeds the predetermined reliability level by a threshold. In some embodiments, whenever a number of nodes changes, the storage system determines a current reliability level of the storage system, and compares the current reliability level with the predetermined reliability level to determine whether the current reliability level of the storage system exceeds the predetermined reliability level by a threshold.

Responsive to determining that the reliability level of the storage system exceeds predetermined reliability level by the threshold, the storage system adjusts 840 a data storing scheme of the storage system to reduce redundancy and increase available storage capacity in the storage system, while maintaining the predetermined reliability level. In some embodiments, the storage system has a first threshold for durability level, and a second threshold for availability level. The storage system determines whether the durability level exceeds a predetermined durability level by the first threshold, and whether the availability level exceeds a predetermined availability level by the second threshold. Only when both thresholds are exceeded, the storage system adjusts the data storing scheme.

In some embodiments, the data storing scheme uses a combination of data chunks and parity chunks to protect data from loss. Parity chunks allow the system to recover lost data in case of failures. When the system becomes more reliable than necessary, the storage system may reduce the number of parity chunks used during data storage, or increase the number of data chunks used during data storage. For example, the original data storing scheme may be an 8+2 erasure coding scheme (8 data chunks, 2 parity chunks), corresponding to RAID 6. The storage system might change the scheme to 8+1 (8 data chunks, 1 parity chunk), corresponding to RAID 5, thereby reducing redundancy and reclaiming storage space. Alternatively, the storage system might change the scheme to 9+2 (9 data chunks, 2 parity chunks). Notably, in an 8+2 erasure coding scheme, 80% of the total storage capacity is used for actual data, and 20% is used for redundancy. In an 8+1 erasure coding scheme, the total storage capacity is increased to 88.9%, and only 11.1% is used for redundancy. By reducing the number of parity chunks from 2 to 1, the storage system is reclaiming 8.9% of storage space that was previously dedicated to redundancy. In a 9+2 erasure coding scheme, 81.8% of the total storage is used for data, and 18.2% is used for redundancy. By increasing the number of data chunks from 8-9, the storage system is reclaiming 1.8% of storage space that was previously dedicated to redundancy.

Similarly, when the number of nodes decreases, the storage system may determine that the reliability level has reduced to below the configured level, and automatically adjust the data storing scheme to increase the reliability level.

Figure 9:
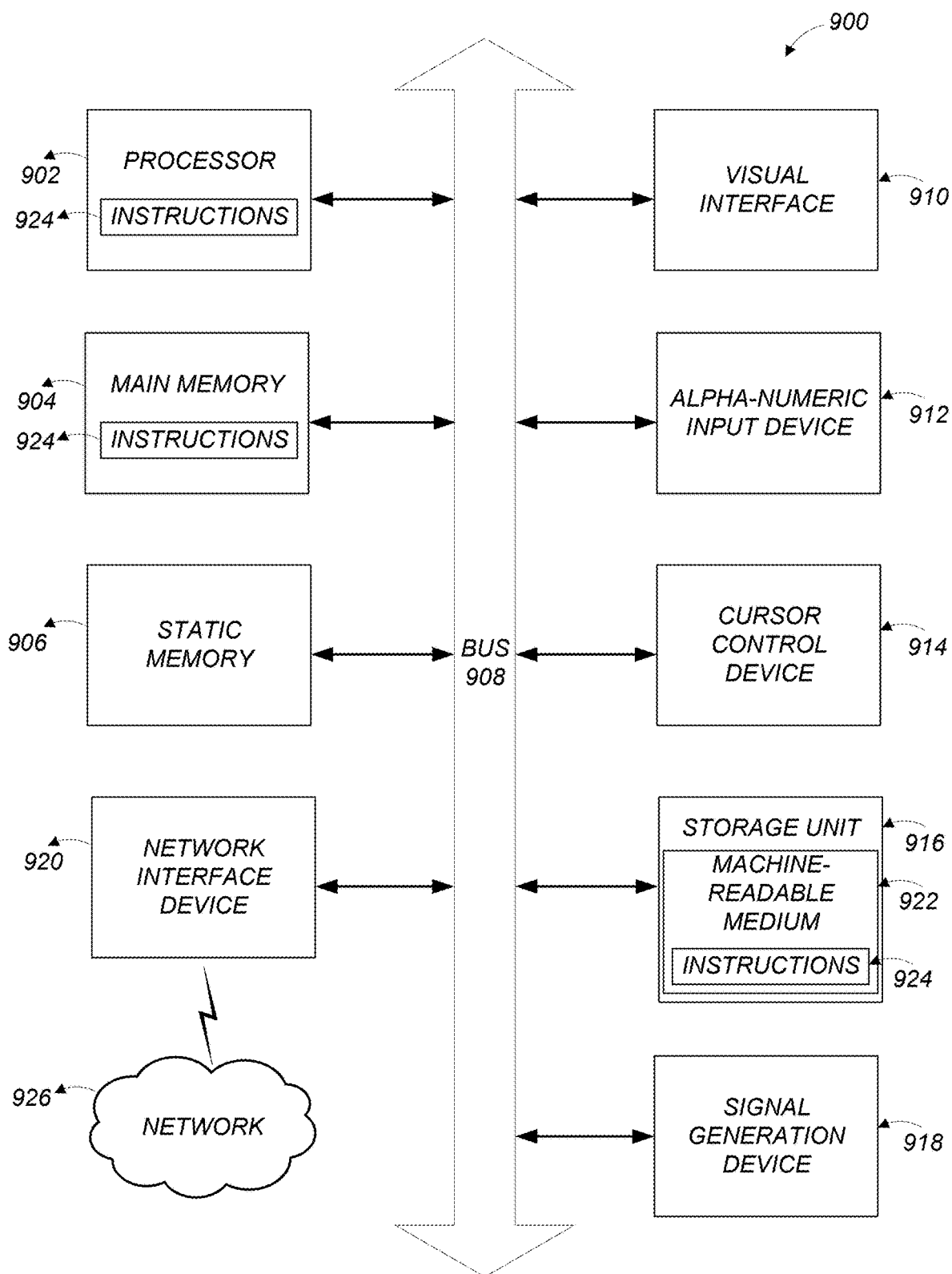
FIG. 9 is a block diagram illustrating components of an example computing system that is able to read instructions from a machine-readable medium and execute them in a processor (or controller) in accordance with one or more embodiments.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard a mouse), a cursor control device 914, a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:
  distributing data across a plurality of nodes in a storage system, wherein the data is stored with partial redundancy to meet a predetermined reliability level;
  monitoring a number of nodes in the storage system to determine whether a number of nodes changes;
  responsive to determining that the number of nodes increases to a second number, determining that reliability level of the storage system exceeds the predetermined reliability level by a threshold based on the second number,
    wherein the second number is determined based on relationship between data availability mean time to not available (MTTNA) and the number of nodes, and
    wherein data availability MTTNA increases as the number of nodes increases; and responsive to determining that the reliability level of the storage system exceeds the predetermined reliability level by the threshold, modifying a configuration of the storage system to reduce a number of parity chunks of the storage system with respect to a number of data chunks, the modification of the configuration causing the storage system to reduce redundancy and increase available storage capacity while maintaining the predetermined reliability level.

2. The computer-implemented method of claim 1, wherein the configuration of the storage system includes storing data in a first number of data chunks and a second number of parity chunks, and the modification of the configuration includes modifying the first number of data chunks or the second number of parity chunks.

3. The computer-implemented method of claim 2, wherein the modification of the configuration includes modifying a ratio of the first number of data chunks relative to the second number of parity chunks, thereby reducing storage overhead required for redundancy.

4. The computer-implemented method of claim 1, wherein the reliability level of the storage system includes at least one of an availability level or a durability level.

5. The computer-implemented method of claim 4, wherein the durability level is determined based on a mean time to data loss (MTTDL).

6. The computer-implemented method of claim 4, wherein the availability level is determined based on a data availability mean time to not available (MTTNA).

7. The computer-implemented method of claim 1, further comprising:
generating a recommendation to modify the configuration of the storage system; and
sending the recommendation to a user for approval.

8. The computer-implemented method of claim 1, wherein modifying the configuration of the storage system includes modifying an erasure coding configuration.

9. The computer-implemented method of claim 8, wherein modifying the erasure coding configuration includes modifying at least one of a number of parity chunks and a stripe width of data chunks.

10. A non-transitory computer readable storage medium storing instructions that when executed by one or more computer processors, cause the one or more computer processors to perform steps comprising:
distributing data across a plurality of nodes in a storage system, wherein the data is stored with partial redundancy to meet a predetermined reliability level;
monitoring a number of nodes in the storage system to determine whether a number of nodes changes;
responsive to determining that the number of nodes increases to a second number, determining that reliability level of the storage system exceeds the predetermined reliability level by a threshold based on the second number,
wherein the second number is determined based on relationship between data availability mean time to not available (MTTNA) and the number of nodes, and
wherein data availability MTTNA increases as the number of nodes increases; and
responsive to determining that the reliability level of the storage system exceeds the predetermined reliability level by the threshold, modifying a configuration of the storage system to reduce a number of parity chunks of the storage system with respect to a number of data chunks, the modification of the configuration causing the storage system to reduce redundancy and increase available storage capacity while maintaining the predetermined reliability level.

11. The non-transitory computer readable storage medium of claim 10, wherein the configuration of the storage system includes storing data in a first number of data chunks and a second number of parity chunks, and the modification of the configuration includes modifying the first number of data chunks or the second number of parity chunks.

12. The non-transitory computer readable storage medium of claim 11, wherein the modification of the configuration includes modifying a ratio of the first number of data chunks relative to the second number of parity chunks, thereby reducing storage overhead required for redundancy.

13. The non-transitory computer readable storage medium of claim 10, wherein the reliability level of the storage system includes at least one of an availability level or a durability level.

14. The non-transitory computer readable storage medium of claim 13, wherein the durability level is determined based on a mean time to data loss (MTTDL).

15. The non-transitory computer readable storage medium of claim 14, wherein the availability level is determined based on a data availability mean time to not available (MTTNA).

16. The non-transitory computer readable storage medium of claim 10, the steps further comprising:
generating a recommendation to modify the configuration of the storage system; and
sending the recommendation to a user for approval.

17. The non-transitory computer readable storage medium of claim 10, wherein modifying the configuration of the storage system includes modifying an erasure coding configuration.

18. The non-transitory computer readable storage medium of claim 17, wherein modifying the erasure coding configuration includes modifying at least one of a number of parity chunks and a stripe width of data chunks.

19. A computing system comprising:
one or more computer processors; and
a non-transitory computer readable storage medium storing instructions that when executed by the one or more computer processors, cause the one or more computer processors to perform steps comprising computer-implemented method, comprising:
distributing data across a plurality of nodes in a storage system, wherein the data is stored with partial redundancy to meet a predetermined reliability level;
monitoring a number of nodes in the storage system to determine whether a number of nodes changes;
responsive to determining that the number of nodes increases to a second number, determining that reliability level of the storage system exceeds the predetermined reliability level by a threshold based on the second number,
wherein the second number is determined based on relationship between data availability mean time to not available (MTTNA) and the number of nodes, and
wherein data availability MTTNA increases as the number of nodes increases; and
responsive to determining that the reliability level of the storage system exceeds the predetermined reliability level by the threshold, modifying a configuration of the storage system to reduce a number of parity chunks of the storage system with respect to a number of data chunks, the modification of the configuration causing the storage system to reduce redundancy and increase available storage capacity while maintaining the predetermined reliability level.

20. The computing system of claim 19, wherein the configuration of the storage system includes storing data in a first number of data chunks and a second number of parity chunks, and the modification of the configuration includes modifying the first number of data chunks or the second number of parity chunks.

* * * * *